United States Patent Office 3,430,475
Patented Mar. 4, 1969

3,430,475
ROLLER DIE BENDING MACHINE FOR FINISHING LONGITUDINAL TUBULAR EDGES INCLUDING GUIDING MEANS PROJECTING INTO A GAP THEREBETWEEN
Bo Mauritz Lindmark, Trollbacken, Sweden, assignor to A. B. Broderna Hedlund, Stockholm, Sweden, a corporation of Sweden
Filed Dec. 7, 1966, Ser. No. 599,883
U.S. Cl. 72—179                            7 Claims
Int. Cl. B21d 5/14, 39/02; B23k 9/02

ABSTRACT OF THE DISCLOSURE

The invention relates to roller die bending machines for finishing the marginal portions of sheet metal blanks having been bent in a prior operation to tubular shape but still having the marginal portions at edges of said portions to be welded together unbent and substantially plane. The machine comprises a roller die unit, roller beds ahead of and behind said unit for guiding the blank through said unit. The roller beds comprise guiding and supporting rolls engaging the opposite edges of said marginal portions and projecting into a gap therebetween. The rolls keep the edges in mutual alignment ahead of the roller die unit and behind the latter, whereby accurate finish bending and straight parallel edges after bending is obtained. High quality welded tubes may thus be manufactured.

---

In the manufacturing of tubes of large dimensions for example of diameters ranging from 500 to 1,000 mm., it is a known practice to start from blanks of mild and alloyed steel or other metals in the form of sheet or band, and roll them to tube blanks, the longitudinal axis of which coincides with the longitudinal direction of the strip. The roll forming operation is usually made in a three roll rolling machine, whereby the sheet is introduced between the rolls with its longest edge and thereafter is subjected to their curving action as it is fed crosswise, coming out of the machine in a bent state essentialy having the form of a tube, but with an opening left between the edges, later to be joined together.

However, after this roll forming operation, the marginal portions of the sheet along the edges to be joined together still remain plane due to the fact that all of the three rolls cannot simultaneously engage the marginal portions of the sheet because the rolls are positioned at a certain distance from each other. The rolled tube blank therefore has not yet acquired the desired completely cylindrical shape. Consequently, in order to obtain this shape a finishing operation, also called second operation bend of the tube blank, has to be performed on the plane marginal portions. The present invention relates to providing a machine capable of doing such second operation bending work in a satisfactory manner.

Second operation bending machines known in the prior art essentially consist of a pair of rolls, one of which has a convex surface contour engaging the tube blank from the inside, the other having a concave surface contour engaging the tube blank from the outside. In order to provide the necessary space in the opening between the edges of the tube blank to permit passage of the supporting bracket mounting the roll engaging from the inside to provide the required roll pressure, it is necessary to provide means for widening the gaps between the edges of the tube blank, so that said edges are moved apart while the tube blank is passing the roll bending unit proper. To this effect guide rolls positioned ahead of and behind said bending unit in the path of the tube blank have been arranged to engage between the longitudinal edges of the tube blank thereby keeping them apart and guiding the tube blank towards the second operation bending unit. Especially when dealing with long tube blanks and at the beginning of the second bending operation of a tube blank just having been introduced with its front end between the bending rolls, the edges at the rear end of the tube blank will not be separated (brought apart) when the operation is performed in machines of the prior art, and these edges will therefore form an angle with each other during the passage of the tube blank between the bending rolls. The result thereof is deficient bending, as the tube blank after the second bending operation still will not have acquired the desired cylindrical shape.

The present invention has as an object to avoid the inconveniences mentioned by providing roller beds with guide and supporting rolls of suitable construction, positioned ahead of and behind the bending unit in a suitable manner. Essential features of the invention principally consist of the roller beds being provided with supporting rolls, arranged and designed to support the tube blank on each side of the opening between the edges to be joined and at points located at a certain distance from said edges, and guiding rolls introduced in said gap or opening between said edges, engaging them on both sides, by means of which supporting and guiding rolls the tube blank is kept in such a position that one of the edges to be joined is at least substantially parallel to the other one ahead of as well as behind the bending unit. The parallelism between the edges to be joined has proven to be of advantage for the purpose of obtaining the desired cylindrical shape of the tube blank during the second operation bending process. Still more precision can be obtained during the second operation bending process, if the supporting and guiding rolls, positioned behind the bending unit in the roller bed, keep and guide the edges already subjected to the second operation bending action in such a manner that said edges in this section will be parallel to the imagined prolongations of the edges ahead of said unit.

The invention also relates to the design of the supporting and guiding rolls, so that they will be able to maintain parallelism between the edges of the tube blank irrespective of the diametrical dimensions of the tubes in so far as they fall within the range of the intended capacity of the machine. To this effect the guiding rolls, introduced into the space between the edges and engaging them, can be designed to be capable of handling the guiding section of tube blanks of different diameters, more particularly in such a way that the guiding rolls positioned ahead of the bending unit have a larger axial extension at the points, where the edges of tube blanks of smaller diameters will be supported, than at the supporting points for tube blanks of larger diameters.

In order to obtain a high degree of precision in the second operation bending process, it has also proven to be of importance that the tube blank in the course of its being fed through the machine maintains a movement along one and the same straight line (straight linear extension) coinciding with its geometrical axis. The machine is suitably designed in such a way that the axial extension of the tube blank is maintained at a substantially horizontal level during the total length of its passage through the machine. To this effect at the points of support of the tube blank on the supporting rolls, the rolls located behind the bending unit can have so much larger diameter than the diameter of the supporting rolls located at the corresponding points of contact ahead of the bending unit that the center line of the tube blank will occupy a constantly unchanged level of height during its passage.

The proper support and guidance of tube blanks of different diameters by means of supporting and guiding rolls are obtained in a most simple way by choosing a suitable contour of the axial cross section of the supporting and guiding rolls. It is also possible to adapt different guiding rolls for each one of the two edges to be joined of the tube blank, but it is simpler to use guiding rolls of the same kind for both edges to be joined, each one of said rolls engaging both edges to be joined and having their lateral contours designed correspondingly.

The invention is further explained below with reference to the accompanying drawings, illustrating a few embodiments of the invention, in which:

(FIGS. 10 and 11 are vertical cross sections of supports belonging to the bending units, in planes perpendicular to the extension of the roller beds.)

Figure 1:
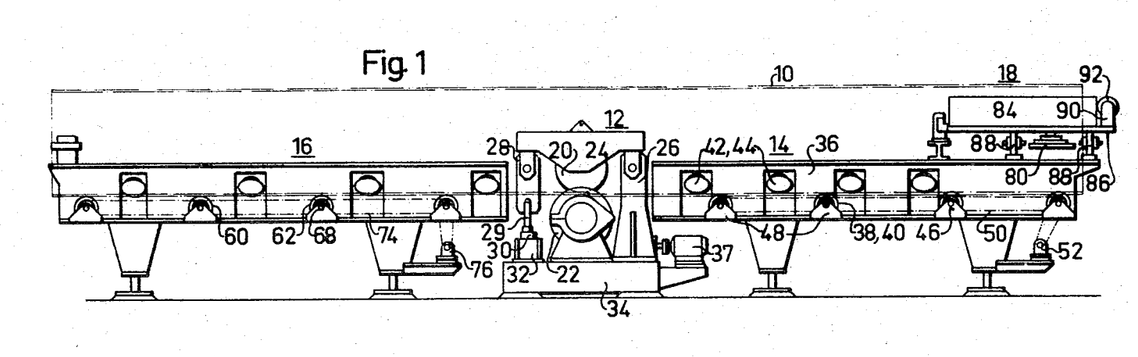
FIG. 1 is a view of a vertical side elevation of a second operation bending or roll forming machine according to a first embodiment of the invention.
Figure 2:
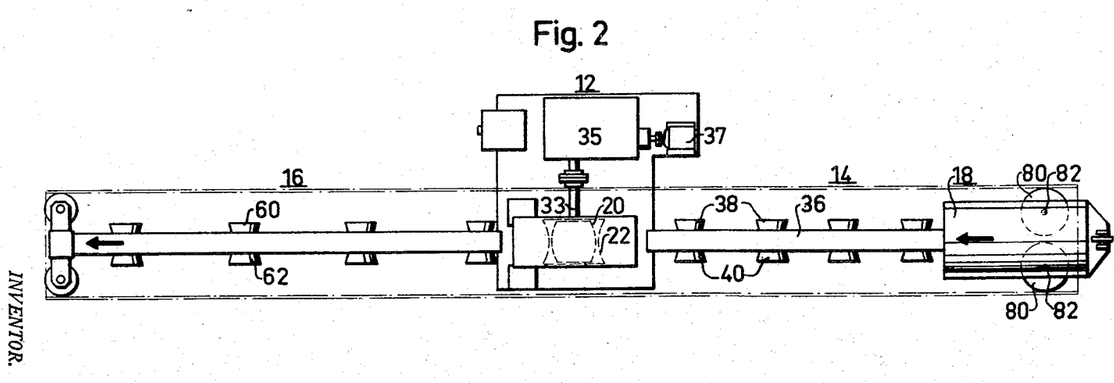
FIG. 2 is a top view of the machine in FIG. 1.
Figure 11:
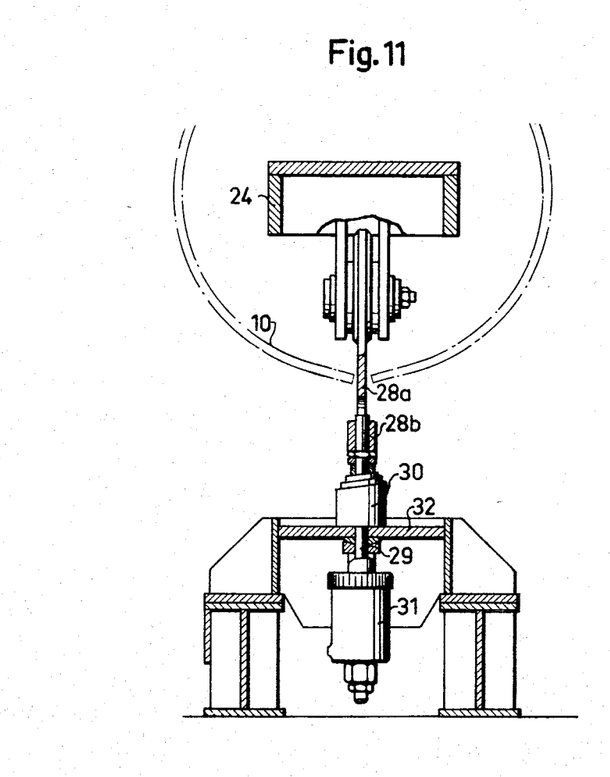

In the embodiment illustrated in FIGS. 1 and 2 the tube blank 10, subjected to the second operation bending to an extent of half its length, is shown with dashed and dotted lines. The whole bending unit itself is marked with 12, a roller bed in the feed direction located ahead of the second operation bending unit is marked with 14, and a roller bed located after said bending unit is marked with 16. The whole of an input unit marked 18 is located at the rear end of the roller bed 14 and is intended to receive the front end of the tube blank to be fed in on this bed and at the same time expand the tube blank, so that its edges to be joined will be further separated from each other. The bending unit itself comprises a roll or roller die 20 engaging the inside of the tube blank, the surface development of said roll or roller die exhibiting a convex curvature, and another roll or roller die 22 engaging the outside of the tube blank, the surface development of the last mentioned roller die exhibiting a concave curvature. The interior roller die 20 is journalled in a top structural part 24, at its rear end pivotally connected with a comparatively thin support 26 and having its front end connected with a piston 29 by a link 28 of laterally thin dimension, said piston engaging a hydraulic cylinder 31 and actuated by a pull back spring 30. The spring 30 is supported on a bridge structure 32 located on the base 34 of the bending unit (FIGS. 1 and 11). The outside roll or roller die 22 is mounted on an axis 33 driven by a motor 37 via a gear box 35 (FIG. 2).

Figure 3:
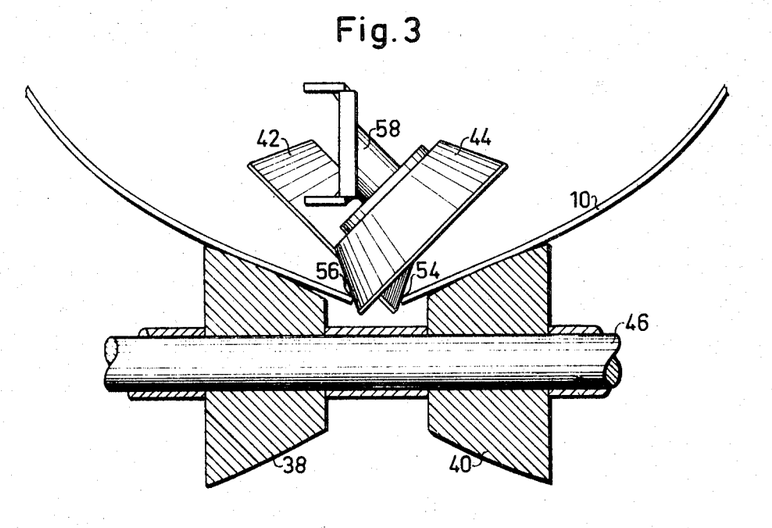
FIG. 3 illustrates in enlarged scale supporting and guiding rolls in cross section along the axis of the guiding in the roller bed path ahead of the bending unit.

The roller bed 14 comprises a horizontal beam 36 and supporting rolls journalled therein, and guiding rolls 42, 44 engaging the edges of the tube blank in the opening between them (FIGS. 1, 2 and 3). An adequate number of rolls of both kinds are arranged in rows straight ahead of each other in order to provide the support and guidance required for keeping the edges to be joined in parallel alignment during the bending operation in the machine. The supporting rolls 38 and 40 are keyed on an axis 46 mounted in bearing brackets 48 and driven by a motor 52 via chain and sprocket wheel drive 50. The guiding rolls 42 as well as the guiding rolls 44 are of conical shape introducing themselves in the space between the edges to be joined of tube blank 10 (FIG. 3) the rolls 42 engaging one of said edges 54, while the guiding rolls 44 engage the opposite edge 56.

In FIG. 3 only one shaft 58 for a guiding roll 44 is shown, but the shafts of both guiding rolls 42 and 44 occupy an inclined position, the cone angle of the rolls at the same time being chosen to the effect that the tangential plane to all of the guiding rolls 42 form a pointed angle with the tangential plane to all of the rolls 44, whereby said angle is pointing in upward direction, i.e. towards the interior of the tube blank. The supporting rolls 38 and 40 are symmetrically arranged relative to the tangential plane of the guiding rolls 42 and 44, so that the edges to be joined 54, 56 of the tube blank will occupy a position between the supporting rolls 38, 40 symmetrically spaced on each side of the center-point between said rolls as shown in FIG. 3. The supporting rolls 38, 40 may be of conical configuration but are preferably given a surface development of convex curvature to engage the exterior (outside) of the tube blank. Such a form is suitable in order to permit the rolls to handle tube blanks of different diameters.

Figure 4:
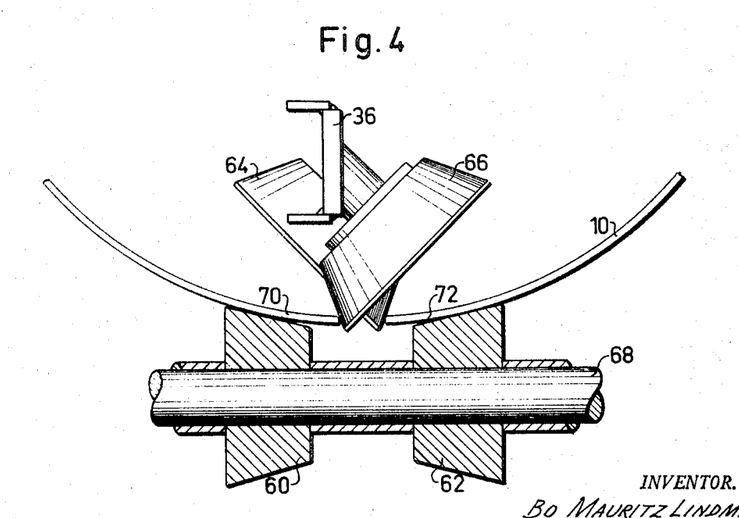
FIG. 4 is a view of a corresponding section in the roller bed path behind the bending unit.
Figure 5:
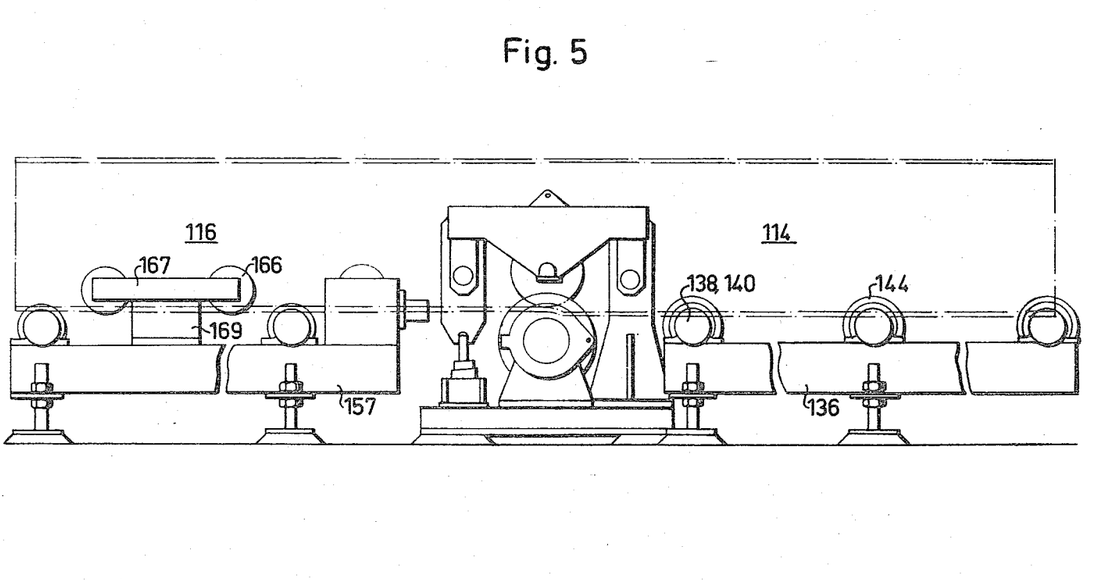
FIG. 5 is a view of a vertical side elevation of the roller beds in a machine according to a second embodiment of the invention.
Figure 6:
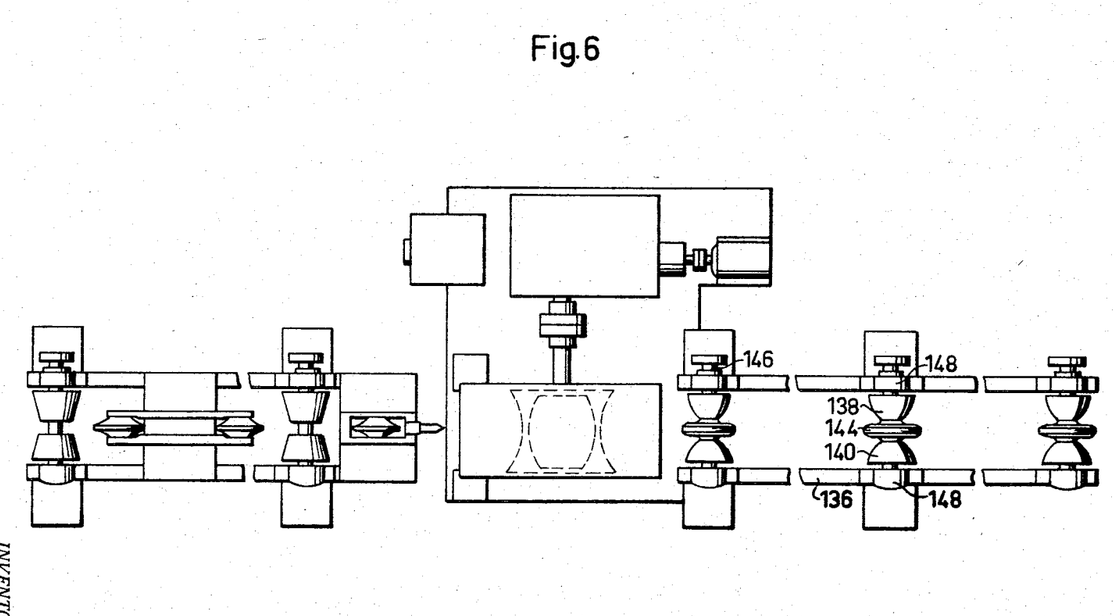
FIG. 6 is a top view of the subject illustrated in FIG. 5.

In the embodiment illustrated in FIGS. 1 and 2 the roller bed 16 positioned (located) behind the bending unit 12 is of substantially the same design as the roller bed 14. Also here supporting rolls 60 and 62 and guiding rolls 64 and 66 are to be found (FIG. 4). However, the supporting rolls 60, 62, which are keyed on a shaft 68, occupy with their upper edges engaging the tube blank 10 a position at a level so much higher above the one of the supporting rolls as is necessitated by the edge portions 70 and 72 of the tube blank in the bending unit having been bent to substantially circular form. Instead of positioning the supporting rolls 60 and 62 at a higher level behind the bending unit then ahead of the same, one can make them of larger diameter or give them a suitable curvature, if only the supporting points of the edge portions of the tube blank will arrive at a sufficiently high level to permit the tube blank to be fed (through the machine) with its centerline at a constant level of height. The guiding rolls 64, 66 are idling, while the supporting rolls 60 and 62 in fixed position on their axis 68 are driven by a motor 76 via a chain and sprocket wheel drive 74 (FIG. 1).

The input unit 18 comprises a pair of rolls 80, rotatably mounted on shafts in parallel alignment with the diametrical plane in which the opening between the edges of the tube blank extends during the second operation bending process. The shafts project from the underside of a hub 84 on a plate 86 supported on the beam 36 by a pair of supporting brackets 88. The rolls 80 have the planes of their rotation positioned substantially in a diametrical plane to the tube blank, their peripheral portions projecting so far laterally that when the tube blank is moved towards them, they will engage diametrically opposed points at the inside of the tube blank and keep said tube blank expanded to some extent in order to permit its edges to be conveyed in forward direction on each side of the guiding rolls. A roll 92 is mounted on a journal bracket 90 on the slab 86, said roll pivoting about a horizontal axis projecting above the hub 84, so that the front end of the tube blank can be supported by the same previous to its being brought into contact with the expansion rolls 80 and engaging the first supporting roll.

Figure 7:
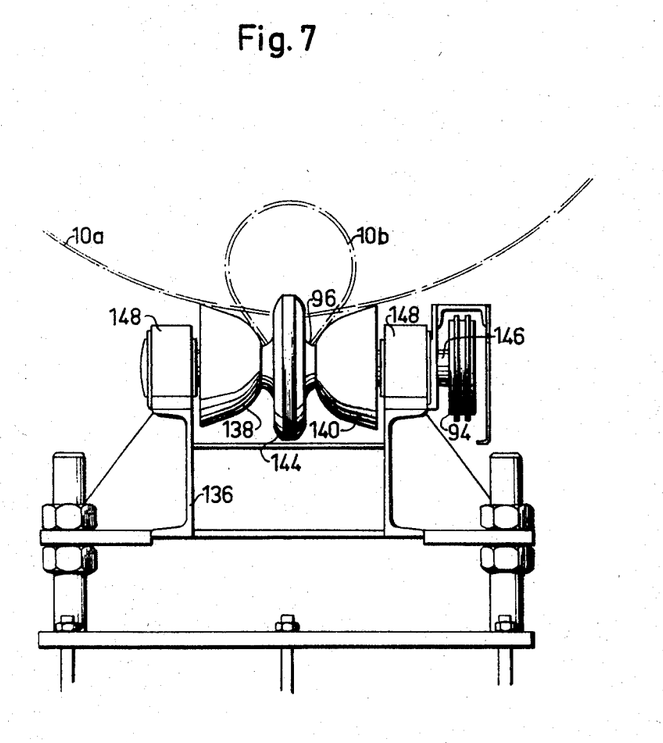
FIG. 7 shows in enlarged scale a vertical rear end view of a roller bed section located ahead of the bending unit according to the embodiment illustrated in FIG. 5 and FIG. 6.

The embodiment illustrated in FIGS. 5 to 8 differs from the described one substantially with regard to the shape of the guiding and supporting rolls, and because of this fact only these rolls and the supporting brackets mounting them are shown. Instead of two series of conical guiding rolls with an inclined axis, viz. one for each of the edges of the tube blank, the embodiment according to FIGS. 5 to 8 comprise a series of guiding rolls common to both of the edges to be joined. Each one of the guiding rolls thus engages both of the said edges. The roller beds 114 ahead of the second operation bending unit in this respect are identical to the roller beds 116 behind the same, whereby, however, the guiding rolls ahead of respectively behind said unit differ as to their form. This also applies to the supporting rolls. As illustrated in FIG. 7 the supporting rolls 138, 140 are mounted on the same shaft 146 as guiding roll 144. The shafts 146 are journalled in bearings 148 on a frame 136 made of structural steel beams. A sprocket wheel 94, belonging to a transmission for the drive of shaft 146, is keyed on axis 146. The supporting rolls 138 and 140, located on each side of guiding roll 144, have a surface development of convex curvature with the smaller diameter adjacent the guiding roll, the laterals of which are designed to constitute a support for the edges of the tube blank. In FIG. 7 two tube blanks 10a and 10b are indicated with dotted lines, of which the first mentioned one is of a very large diameter and the latter one of a fairly small diameter. The supporting rolls as well as the laterals of the guiding rolls are adapted for the support and guidance of both these tube blanks. The first mentioned tube blank 10a abuts against the supporting rolls near their extremes where the diameter is largest, while the smaller tube blank 10b finds support closer to the guiding roll, where its edges are guided towards a substantially conically shaped boss 96 on the guiding roll. This form and the symmetric arrangement of the assembly secure an accurate guiding of the tube blanks, irrespective of their diameter, so that the edges of the tube blanks will extend in parallel alignment during the whole passage through the machine. The proper functioning is conditioned by an adequate number of guiding and supporting rolls being arranged straight behind each other and suitably interspaced.

The guiding rolls 166 in the roller bed 116, positioned behind the bending unit, are journalled on bars 167 fixed on the upper edge of upwardly projecting supports 169, which are mounted on the frame 157 of the roller bed. The supporting brackets 169 are sufficiently thin to permit their passage between the edges of the tube blank to be joined. The guiding rolls thus are positioned inside the tube blank and engage between the edges to be joined of the same from above. The thickness of these rolls diminishes from their boss portions towards the periphery, so that they are well adapted for engagement between the edges of tube blank 10a of a large diameter as well as between the edges of tube blank 10b of small diameter. Conical supporting rolls 160, 162 (FIG. 8) are keyed on an axis 160 provided with a sprocket wheel 174 keyed on the same, said sprocket wheel forming part of a chain and sprocket wheel transmission for the drive of shafts 168 and thus also the supporting rolls. Bearings 175 on frame 157 mount the shafts 168.

Figure 9:
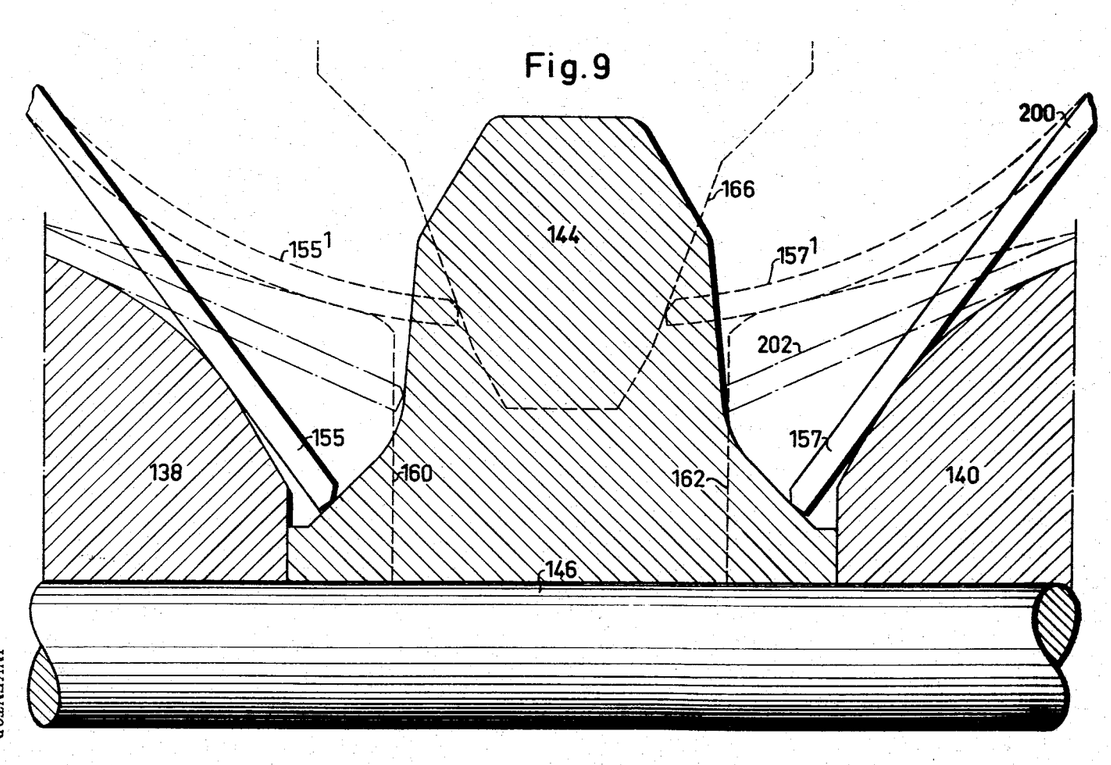
FIG. 9 illustrates in enlarged scale the contour of the guiding and supporting rolls in cross section through a roller axis corresponding a section of the roller bed located ahead of the bending unit.

How the parallel alignment between the edges to be joined ahead of and behind the bending unit can be maintained is further illustrated in FIG. 9. Here continuous lines indicate the profile of a guiding roll 166 behind the bending unit at correct vertical level relative to the guiding roll 144 ahead of the bending unit, whereby it is understood that the roller beds are constructed to permit the tube blank to be fed through the machine along its horizontal geometrical axis. Dotted lines also indicate the profile of supporting rolls 160, 162. Ahead of the bending unit the substantially straight edge portions 155, 157 of a tube blank indicated with continuous lines find a support against the comparatively wide boss portion of guiding roll 144, their edge portions at the same time resting with their undersides engaging the convexly curved contour of the supporting rolls 138, 140 comparatively close to the shaft of these rolls. In analogous fashion the edge portions 155', 157' are supported by the supporting rolls 160, 162 behind the bending unit, whereby these rolls have so much larger diameter at the points of contact that they can lend support to the tube blank without an upward displacement taking place. In accordance with the above it appears from FIG. 9 that the wall 200 of the tube blank above the edge portions subjected to roller bending treatment will occupy an unchanged position before and after the bending operation. The supporting rolls are symmetrically arranged relative to the cross section through the center of the guiding rolls perpendicular to the pivoting axis and also the guiding rolls are symmetrically arranged in relation to said cross section. Moreover, because of the guiding rolls 144 being positioned straight behind the guiding rolls 166 the edges to be joined of the tube blank will be parallel to each other before as well as after the second operation bending process in the bending unit.

Figure 8:
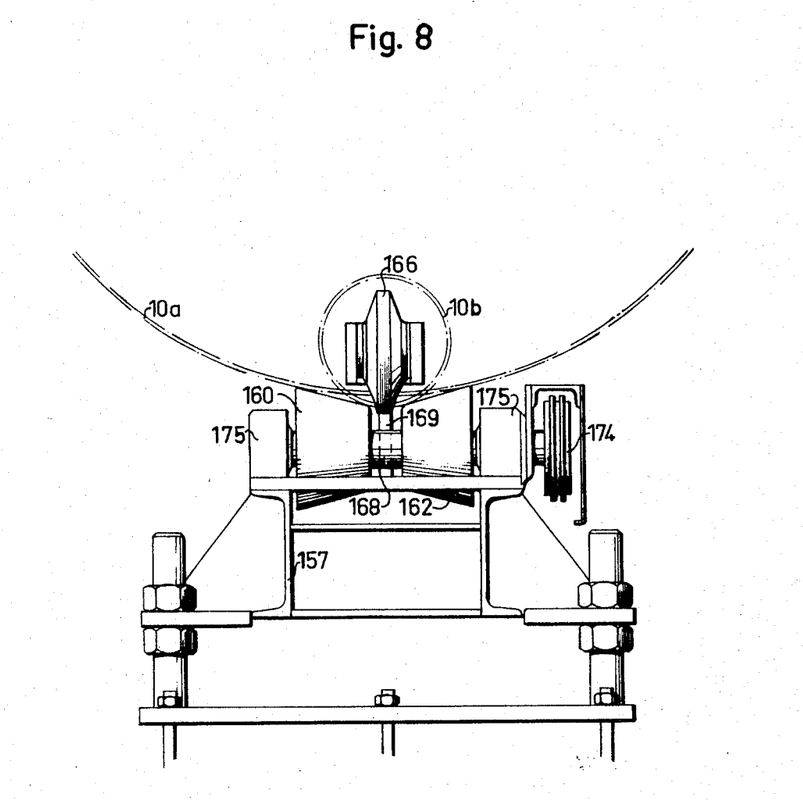
FIG. 8 shows in a similar way to the roller bed portion behind the bending unit.

As is disclosed by FIGS. 7 and 8 the second operation bending machine can be used for treatment of tube blanks of diameters varying within wide ranges, i.e. tube blanks of relatively large diameter as 10a, and tube blanks of relatively small diameter as 10b. The tube blank indicated in FIG. 9 with continuous lines has a comparatively small diameter and has its edges to be joined resting against the thick boss portion of the guiding roll 144. In FIG. 9 the edges of a tube blank 202 are indicated by dashed and dotted lines, said tube blank having a larger diameter before the bending operation than the one indicated by continuous lines. After the bending operation the edges of the tube blank 202 will engage the guiding rolls 166 in about the same points as the edges 155' and 157' of the previously mentioned tube blank, this thanks to the shape of the guiding rolls 160 and 162. This yields the advantage that irrespective of the diameter of the tube blank at the moment in question being subjected to a second operation bending in the machine there is a guarantee for the edges to be joined being kept sufficiently apart to permit the passage of the bending unit and the supports of the guiding rolls between them.

Figure 10:
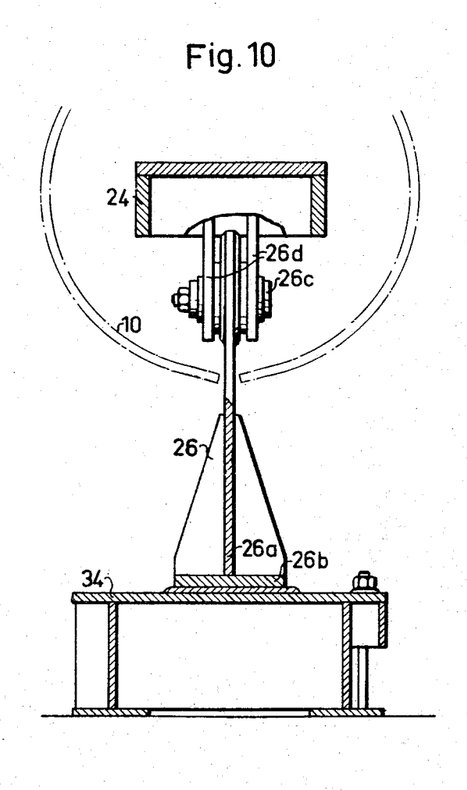
FIGS. 10 and 11 show supports belonging to the bending unit in vertical sectional planes perpendicular to the extension of the roller beds.

In FIG. 10 the support 26 at the input side of the bending unit is shown, said support comprising substantially a vertical plate 26a provided with a foot 26b fastened with screws on the frame 34. The plate has its broad sides parallel to the feed direction of the tube blank 10 and is thinner than the opening between the edges to be joined of the tube blank. Inside the tube blank the plate 26a is reinforced and carried on a pivot stud 26c, mounted in a yoke 26d, extending downwards from top piece 24, in which the roller die 20 is journalled (see FIG. 1). The support 28 at the output side of the bending unit comprises (as shown in FIG. 11) a plate 28a intended to be positioned in the opening between the edges to be joined of the tube blank during the second operation bending, the piston rod 29 fastened to said plate, a threaded supporting sleeve 28b on the piston rod, and the hydraulic cylinder 31 and spring 30, which at its inferior end rests on the bridge 32 and with its upper end abuts against the inferior end of the sleeve 28b. Application of a force urging the upper roller die 20 in downwards direction against the lower roller die 22 is made by the introduction of a pressure fluid in the cylinder 31 causing the piston 29 to move downwards under the pressure created. The spring 30 thereby actuates as a return spring for the lifting up action of the piston after the second operation bending has been performed.

The function of the machine described has generally been disclosed of the foregoing. In conclusion it may be mentioned that a roll formed tube blank, which shall be second operation bent in the machine, is introduced from the right side in FIG. 1 at the input unit 18, where it first will rest upon the roll 92 with the inside of its highest positioned portion. It is thereafter conveyed further into the machine above the expansion rolls 80, which shall be adjustable as to the distance between them in order to facilitate a suitable degree of expansion of the tube blank. The edges to be joined of the same will then be sufficiently separated to permit the guiding rolls 42, 44 (FIG. 1) respectively the guiding roll 144 (FIG. 7) to be introduced in between them. The supporting rolls 38, 40 and 138, 140, respectively, which are driven, act to feed the tube blank towards the roller dies 20, 22, which bend the essentially straight edge portions to be joined, until they acquire cylindrical form. After the bending operation the supporting rolls of the roller bed 16 more and more take over the feeding motion. The guiding rolls ahead of and behind the bending unit in conjunction with the supporting rolls cause the tube blank to move along with the edges to be joined in parallel alignment ahead of as well as behind the bending unit, thereby making possible that an accurate second operation bending of the tube blank to cylindrical form can be obtained.

What I claim is:

1. A roller die bending machine for finishing unbent, marginal portions of a substantially tubular sheet metal blank having a longitudinal gap to a shape corresponding that of the rest of said blank, comprising a roller die bending unit, a roller bed extending to said unit for feeding said blank, and a further roller bed for receiving the blank after bending the marginal portions in said unit, both said roller beds including supporting roll means mounted to support said tubular blank at points located on opposite edges of said marginal portions and exterior thereto and guide roll means engaging edges bounding said gap and projecting thereinto, said supporting and guide roll means maintaining the alignment of said blank.

2. Machine as claimed in claim 1, characterized in that the supporting roll means behind the roller die bending unit at the points of contact, where the tube blank is supported, have so much larger diameter than the diameter of the supporting roll means ahead of the roller die bending unit at the corresponding points of contact, that the axis of the tube blank will move along one and the same straight line during the passage of said tube blank through the machine.

3. Machine as claimed in claim 1, characterized in that guiding roll means located in the roller bed sections ahead of and behind the roller die bending unit are arranged in two rows in the roller bed path, one row engaging one of said edges and the other one engaging the other of said edges, whereby each such means has a conical surface development engaging said edge.

4. Machine as claimed in claim 1, characterized in that the guiding roll means located in the roller bed ahead of and behind the roller die bending unit are arranged in one row straight behind each other, each guiding roll means having one of its sides engaging one of said edges and its other side engaging the other of said edges.

5. Machine as claimed in claim 4, characterized in that the guiding roll means engaging in between the edges having an axial cross sectional contour sloping from a broad base portion adjacent the roller axis gradually are getting thinner towards an edge portion of larger diameter.

6. Machine as claimed in claim 1, characterized in that the supporting means located ahead of the roller die bending unit have a convexly curved contour for engagement of the tube blank.

7. Machine as claimed in claim 1, characterized in that the supporting means located behind the roller die bending unit are substantially of conical shape.

References Cited

UNITED STATES PATENTS

| 2,306,945 | 12/1942 | Hebron | 29—477.7 X |
| 2,613,303 | 10/1952 | Babbitt | 219—59 |
| 2,890,321 | 6/1959 | Nitkiewicz | 219—59 |
| 3,014,118 | 12/1961 | Vassar | 219—59 |

MILTON S. MEHR, *Primary Examiner.*

U.S. Cl. X.R.

219—105; 228—5; 29—477.7; 72—52